No. 641,487. Patented Jan. 16, 1900.
H. P. ARBECAM.
INDICATOR FOR SHIPS' COMPASSES.
(Application filed Jan. 23, 1899.)
(No Model.)
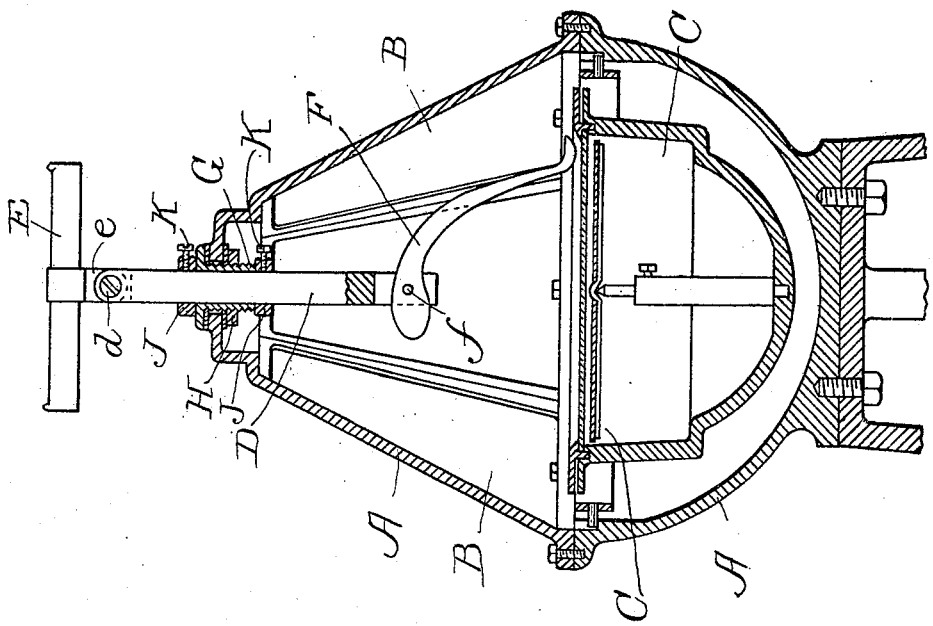
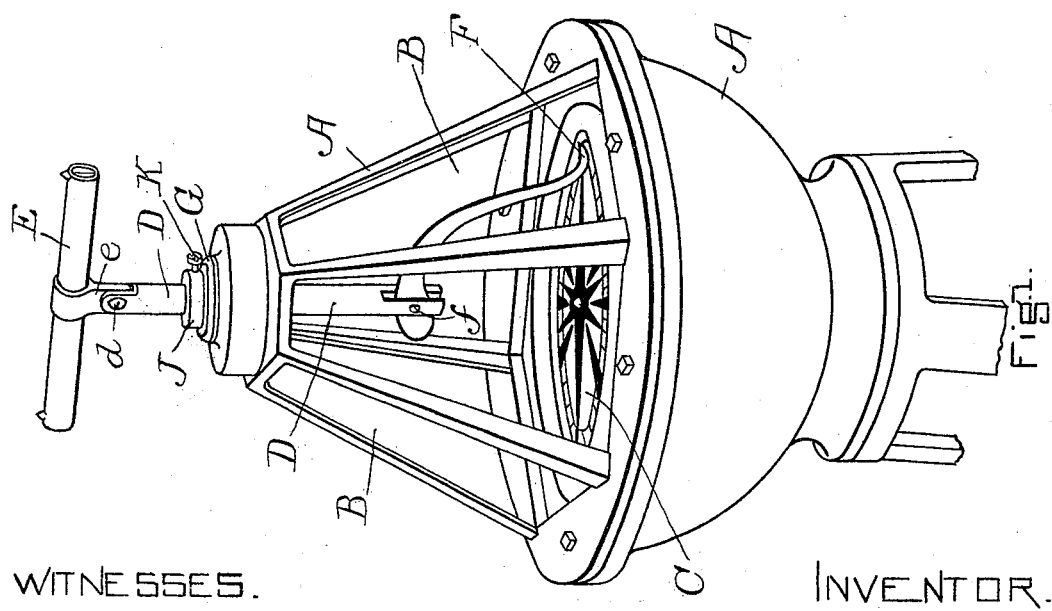
WITNESSES.
Matthew M Blunt
Francis V. Dakin
INVENTOR.
Harry Peyton Arbecam
by S. H. Spencer
ATT'Y.

UNITED STATES PATENT OFFICE.

HARRY PEYTON ARBECAM, OF BOSTON, MASSACHUSETTS, ASSIGNOR TO THE ARBECAM INDICATOR COMPANY, OF SAME PLACE.

INDICATOR FOR SHIPS' COMPASSES.

SPECIFICATION forming part of Letters Patent No. 641,487, dated January 16, 1900.

Application filed January 23, 1899. Serial No. 703,054. (No model.)

*To all whom it may concern:*

Be it known that I, HARRY PEYTON ARBECAM, of Boston, in the county of Suffolk and State of Massachusetts, have invented certain new and useful Improvements in Indicators for Ships' Compasses, of which the following is a specification.

The object of this invention is to provide an improved indicating device for ships' compasses whereby the bearings of an object at a distance from the ship may be taken with accuracy and indicated at once on the dial of the compass.

My invention is an attachment to the binnacle which incloses or covers the compass; and it consists in a rotatable central shaft extending vertically through a bearing in the binnacle-top and terminating inside of the binnacle a considerable distance above the compass-dial, a curved or oblique radial arm attached to the lower end of said shaft and extending downwardly toward and nearly to the margin of the dial, and a horizontal pointer external to the binnacle, pivoted on the upper end of the shaft for vertical movement in the same plane as said radial arm. By means of said pointer and shaft the bearing of any object toward which the pointer is directed is accurately shown by the position simultaneously taken by the tip of said arm over the margin of the compass-dial.

The pointer is preferably tubular, with external and internal sights, and it is secured to the shaft-top by a pivot, permitting independent movement in vertical planes only. The radial indicating-arm is light and preferably conterbalanced, and its tip reaches close to the margin of the dial, leaving the view and movement of the compass unobstructed. The bearing for the vertical shaft is preferably a flanged tube introduced through the binnacle-top and held in position by a clamping-nut screwed upon said tube, and the proper height of the shaft therein is maintained by adjustable rings or collars above and below said tube.

In the drawings, Figure 1 is a perspective view of one form of binnacle inclosing a compass and provided with my improvement. Fig. 2 is a vertical central section showing details of the device.

A represents the binnacle frame or casing, which will be of any ordinary or suitable form and provided with windows B for the admission of light and for observation of the compass C, which is suspended in the usual manner so that the dial is horizontal and the magnetic needle connected thereto points always to the north.

Centrally in the top of the binnacle I provide a circular opening to form or receive a bearing for the vertical rotatable shaft D, which connects the external pointer E with the radial indicating-arm F. As shown in Fig. 2, the bearing consists of a cylindrical tube G, having at the upper end a flange or fixed collar to rest against the binnacle-top, such tube being screw-threaded to receive a clamping-nut H, by which it may be held in position. Such tube may, however, be otherwise secured, or the bearing may be formed integral with the binnacle-top. The shaft D is furnished with an adjustable collar J and set-screw K above and below its bearing to hold it at the proper height.

The external pointer E is represented as tubular and provided with terminal sighting-points for ordinary use and with vertical slot and wire sights in the ends of the tube for accurate work. The upper end of the shaft D is represented as slotted to receive a tongue *e*, extending downwardly from the tubular pointer, such shaft and tongue being connected by a horizontal pivot *d*. The lower end of the shaft has a similar slot in the same vertical plane to receive the upper part of the indicating-arm F, the two being connected by a pivot F, on which the arm is counterbalanced, so that its position with relation to the horizon is not disturbed by the rolling of the ship. The extremity of the arm F comes close to the margin of the compass-dial and will indicate thereon the bearing of any object toward which the pointer E is directed.

The curved or oblique position of the indicating-arm F is of importance, because it permits the central shaft D to be shortened and not brought down to the face of the compass. This arrangement leaves the compass-dial unobstructed and affords a plain view of the lubber-mark on the dial-casing, which mark denotes always the direction of the prow of the ship.

Indicators have heretofore been proposed having the vertical shaft extended down to the center of the dial and jointed to the middle of the indicating-bar resting on the dial. In another form said bar was held just above the face of the compass by two bowed arms rigidly secured to the lower end of said shaft and reaching to the ends of said bar at the margin of the dial. Both these forms are objectionable, as tending to obstruct or confuse the view and to interfere with the free movement of the compass-dial. With my device the pivoted and counterbalanced indicator maintains a uniform distance from the dial and points to one position only thereon at any given time. The pointer being continuous and centrally pivoted to the top of the shaft, so that it can be directed to the horizon at any time regardless of the movements of the binnacle-frame with the ship, is another material advantage.

I claim as my invention—

1. The described indicator for ships' compasses, consisting of a tubular pointer attached to the upper end of a rotatable vertical shaft which extends through the top of a ship's binnacle, in combination with a pivoted indicating-arm attached to the lower end of said shaft above the compass, in the vertical plane of said pointer, and extending downwardly and outwardly in one direction only nearly to the margin of the compass-dial, so as to indicate thereon the bearing of any object toward which the pointer is directed, substantially as set forth.

2. The described indicator for ships' compasses, consisting of a vertical, rotatable shaft mounted centrally in the binnacle-top and a pointer pivoted to the top of said shaft for movement thereon in vertical planes and adapted to rotate with the shaft only, in combination with a radial and counterbalanced indicator-arm pivoted to the foot of said shaft in the same plane as said pointer at such height above the dial as to afford an unobstructed view thereof and extending to the margin of the dial, the counterbalancing of said arm keeping its extremity at a uniform distance from the dial, substantially as set forth.

In testimony whereof I have affixed my signature in presence of two witnesses.

HARRY PEYTON ARBECAM.

Witnesses:
H. W. LADD,
W. E. AYRES.